United States Patent [19]
Ryan et al.

[11] Patent Number: 5,512,184
[45] Date of Patent: *Apr. 30, 1996

[54] AMPHOLYTIC POLYMERS AND POLYMERIC MICROEMULSIONS

[75] Inventors: Michael S. Ryan, Fairfield; David L. Dauplaise, Stamford; Robert J. Proverb, Fairfield, all of Conn.

[73] Assignee: Cytec Technology Corp., Wilmington, Del.

[ * ] Notice: The term of this patent shall not extend beyond the expiration date of Pat. No. 5,380,444.

[21] Appl. No.: 303,262

[22] Filed: Sep. 8, 1994

Related U.S. Application Data

[63] Continuation of Ser. No. 200,795, Feb. 23, 1994, Pat. No. 5,380,444.

[51] Int. Cl.⁶ ............................................. C02F 1/56
[52] U.S. Cl. ............................................. 210/734; 210/733
[58] Field of Search ............................ 210/734, 733

[56] References Cited

U.S. PATENT DOCUMENTS

| | | | |
|---|---|---|---|
| 4,010,131 | 3/1977 | Phillips et al. | 260/29.4 |
| 4,137,164 | 1/1979 | Coscia et al. | 210/54 |
| 4,242,247 | 12/1980 | Pellon et al. | 260/29.6 |
| 4,282,928 | 8/1981 | McDonald et al. | 166/274 |
| 4,330,450 | 5/1982 | Lipowski et al. | 524/547 |
| 4,363,886 | 12/1982 | Lipowski et al. | 523/336 |
| 4,376,850 | 3/1983 | Sanner | 526/196 |
| 4,435,528 | 3/1984 | Domina | 523/332 |
| 4,464,508 | 8/1984 | Easterly, Jr. | 524/787 |
| 4,521,317 | 6/1985 | Candau et al. | 252/8.55 |
| 4,681,912 | 7/1987 | Durand et al. | 524/827 |
| 4,705,640 | 11/1987 | Whittaker | 210/733 |
| 4,956,399 | 9/1990 | Kozakiewicz et al. | 523/223 |
| 4,956,400 | 9/1990 | Kozakiewicz et al. | 523/223 |
| 5,037,863 | 8/1991 | Kozakiewicz et al. | 523/223 |
| 5,037,881 | 8/1991 | Kozakiewicz et al. | 524/812 |
| 5,132,023 | 7/1992 | Kozakiewicz et al. | 210/734 |
| 5,171,782 | 12/1992 | Candau et al. | 524/801 |
| 5,171,808 | 12/1992 | Ryles et al. | 526/264 |

FOREIGN PATENT DOCUMENTS

| | | | |
|---|---|---|---|
| 2157100 | 6/1909 | Japan . | |
| 3169398 | 7/1981 | Japan . | |
| 63-218246-A | 9/1988 | Japan . | |
| 1489046 | 10/1977 | United Kingdom | C08F 8/30 |
| 2162492 | 7/1984 | United Kingdom . | |

OTHER PUBLICATIONS

U.S. Ser. No.: 08/018858, filed Feb. 12, 1993, Sy Huang et al. Titled: Quaternized Tertiary Aminomethyl Acrylamide Polymer Microemulsions With Improved Performance.
U.S. Ser. No.: 07/860542, filed Mar. 30, 1992, Kozakiewicz et al. Titled: Emulsified Mannich Acrylamide Polymers.

*Primary Examiner*—Neil McCarthy
*Attorney, Agent, or Firm*—Claire M. Schultz

[57] ABSTRACT

Quaternary dialkylaminomethyl polymers derived from (alk)acrylamide and about 1 to about 15 mole percent ethylenically unsaturated anionic comonomer wherein the resulting ampholytic polymer has a standard viscosity of at least about 2.1 cps am disclosed. Processes for the preparation of these polymers and their use in flocculating suspended material in a variety of aqueous dispersions are also disclosed.

11 Claims, No Drawings

AMPHOLYTIC POLYMERS AND POLYMERIC MICROEMULSIONS

This is a continuation of application Ser. No. 08/200,795, filed on Feb. 23, 1994, now U.S. Pat. No. 5,380,444.

This invention relates to ampholytic polymers, more specifically to polymers of quaternized, aminomethyl (alk)acrylamide and about 1 to about 15 mole percent anionic comonomer. Microemulsions comprising such polymers are also disclosed. Methods of using these polymers and microemulsions for flocculating suspended material in a variety of aqueous dispersions and processes for the preparation of the ampholytic polymers and microemulsions containing such polymers are also encompassed within this invention.

BACKGROUND OF THE INVENTION

Amino methylated or Mannich (alk)acrylamide polymers in inverse (water-in-oil) microemulsion form are used as flocculants for separating suspended material from aqueous dispersions. As such, they are preferred over other types of flocculants because of their high solids content, low bulk viscosity, their tendency to reduce interpolymer crosslinking problems, and superior performance. These inverse microemulsion Mannich acrylamide polymers (microemulsion Mannich PAMS) are described in U.S. Pat. Nos. 4,956,399; 4,956,400; 5,037,863; 5,132,023 and 5,037,881, which are incorporated herein by reference. Oftentimes, these Mannich acrylamide polymers are quaternized and used in their highly charged cationic state. It has been found, however, that for certain flocculant applications, the cationic charge on the microemulsion Mannich PAMS may be too high and may inhibit the performance of the polymeric flocculant. For example, many aqueous dispersions containing paper deinking sludge or other suspended material resulting from the processing of recycled paper have relatively low cationic demand. Consequently, highly cationized quaternary microemulsion Mannich PAMS have not performed as efficiently as desired in these flocculating applications. Ampholytic polymers have been found to be a viable alternative.

Ampholytic polymers in emulsion form are known to be useful for treating sewage and industrial wastes as disclosed in U.S. Pat. Nos. 4,330,450 and 4,363,886. But these polymeric emulsions do not provide the benefits of microemulsions, (e.g. higher solids and reduced crosslinking). Furthermore, the amount of anionic comonomer sufficient to provide a polymer with a standard viscosity of at least 2.1 cps for effective treatment of sludge having a relatively low cationic demand is also not provided.

Japanese patent application No.63-218246 discloses a polymeric water-in-oil emulsion having anionic and cationic properties which is made by mixing an anionic polymeric inverse emulsion having 5 to 100 mole percent anionicity with a cationic polymeric inverse emulsion having 5 to 100 mole percent cationization. This system does not, however, provide ampholytic properties, due to charge neutralization, since the charges result from a mixture of two differently charged polymers as opposed to a single ampholytic polymer.

Compositions comprising crosslinked anionic or amphoteric polymeric microparticles, as taught in U.S. Pat. No. 5,171,808, may be used for facilitating the solid-liquid seperation of various biologically treated suspensions but such polymeric microparticles only have solution viscosities of at least 1.1 mPa.s and may not flocculate as well as desired.

While ethylenically unsaturated anionic comonomers have been incorporated into microemulsion Mannich PAMs, see e.g., U.S. Pat. No. 4,956,400 and U.S. patent application Ser. No. 07/860,542 filed on Mar. 30, 1992, and incorporated into Mannich PAMs, see e.g., U.S. Pat. No. 4,137,164 , the effective amount of anionic comonomer cannot be ascertained from these patents and not all of the resulting anionic copolymers disclosed in the patents are particularly effective in treating aqueous dispersions having a low cationic demand or high total solids. Even if one were to quaternize the resulting anionic copolymers to provide ampholytic copolymers, the resulting ampholytic copolymers would also be ineffective for treating aqueous dispersions, particularly those having low cationic demand and/or high total solids.

There exists a need for polymeric flocculant that can be prepared at high polymer solids levels and can perform effectively in treating aqueous dispersions especially those having a low cationic demand or high total solids. It has now been found that copolymers of quaternary aminomethyl (alk)acrylamide and about 1 to about 15 mole percent of at least one ethylenically unsaturated anionic comonomer wherein such copolymers have a standard viscosity of at least 2.1 cps provide superior flocculating performance relative to microemulsion Mannich PAMS and other flocculant agents in the an with respect to certain aqueous dispersions containing suspended materials. While these polymers provide the benefits of microemulsion Mannich PAMS, such as low bulk viscosity and high solids content, and may be used like the known Mannich P AM microemulsions in various flocculation applications, the ampholytic polymers of the present invention also tend to be more effective in flocculating aqueous dispersions which don't flocculate well using highly cationically charged polymers, i.e., aqueous dispersions such as sludges which have a somewhat lower cationic demand.

Therefore the present invention provides ampholytic polymers or copolymers of quaternized dialkylaminomethylated (alk)acrylamide and anionic comonomer which provide all of the benefits of microemulsion Mannich PAMS yet also tend to be more effective than current cationic flocculants in treating suspended solids in aqueous dispersions having somewhat lower cationic demands and sludges having total solids levels of at least about 4 weight percent.

The present invention also provides a process for preparing an ampholytic copolymer and an inverse microemulsion ("microemulsion" herein) comprising an ampholytic copolymer of quaternary dialkylaminomethyl (alk)acrylamide and ethylenically unsaturated anionic comonomer having a standard viscosity of at least 2.1 cps. Methods of using these ampholytic polymers to flocculate suspended material in various aqueous dispersions such as deinking process waters resulting from the processing of recycled paper and various sludge-containing dispersions are also encompassed within the present invention.

SUMMARY OF THE INVENTION

According to the present invention, there is provided copolymers of quaternary dialkylaminomethyl (alk)acrylamide and about 1 to about 15 mole percent ethylenically unsaturated anionic comonomer which have a standard viscosity of at least about 2.1 cps when measured at 0.1 percent concentration in a 1 molar sodium chloride solution.

It is preferred that the anionic comonomer content range from about 2 to about 12 mole percent, more preferably from about 5 to about 10 mole percent, which results in a copolymer (also called polymer herein) having a standard viscosity of at least about 2.8 cps. Most preferably about 10 mole percent ethylenically unsaturated anionic comonomer is incorporated into the polymer to provide a polymer having a standard viscosity of approximately 2.8 cps. Preferred anionic comonomers include acrylic acid, methacrylic acid and 2-acrylamido 2-alkyl sulfonic acid. Acrylamide is a preferred (alk)acrylamide. The presence of the anionic comonomer and quaternary dialkylaminomethyl (alk)acrylamide units in the polymer render it ampholytic.

The ampholytic polymers of the present invention are prepared by polymerization in an inverse (water-in-oil) microemulsion, also referred to herein as microemulsion polymerization. A preferred process for preparing ampholytic polymeric microemulsions of the present invention comprises:
(a) admixing in any order:
  (i) an aqueous solution comprising (alk)acrylamide monomer and about 1 to about 15 mole percent ethylenically unsaturated anionic comonomer;
  (ii) at least one hydrocarbon liquid; and
  (iii) an effective amount of surfactant or surfactant mixture so as to form an inverse microemulsion;
(b) subjecting the inverse microemulsion obtained in step (a) to polymerization conditions;
(c) reacting the polymer resulting from step (b) with an effective amount of formaldehyde and a secondary amine, or a complex formed by said formaldehyde and secondary amine;
(d) quaternizing the polymer resulting from step (c); and
(e) heat treating the quaternized polymer resulting from step (d) to provide a polymer with a standard viscosity of at least about 2.1 cps when measured at 0.1 percent concentration in a 1 molar sodium chloride solution, by:
  (i) treating the polymer by adding, in any order, effective amounts of acid, a formaldehyde scavenger compound and water; and
  (ii) heating the treated polymer to a temperature of from about 40 to about 80° C. for about 3 to about 20 hours.

In a second embodiment, the ampholytic polymeric microemulsion is prepared by:
(a) reacting
  (i) at least one (alk)acrylamide monomer, and
  (ii) formaldehyde and a secondary amine or a complex thereof in an aqueous solution to produce a tertiary aminomethyl substituted (alk)acrylamide monomer;
(b) admixing
  (i) said aqueous solution of substituted (alk)acrylamide monomer and about 1 to about 15 mole percent ethylenically unsaturated anionic comonomer, and
  (ii) at least one hydrocarbon liquid; and
  (iii) an effective amount of surfactant or surfactant mixture so as to form an inverse microemulsion;
(c) subjecting the inverse microemulsion obtained in step (b) to polymerization conditions; and
(d) quaternizing the polymer resulting from step (c); and
(e) heat treating the quaternized polymer resulting from step (d) to provide a polymer with a standard viscosity of at least about 2.1 cps when measured at 0.1 percent concentration in a 1 molar sodium chloride solution, by:
  (i) treating the polymer by adding, in any order, effective amounts of acid, a formaldehyde scavenger compound and water, and
  (ii) heating the treated polymer to a temperature of from about 40 to about 80° C. for about 3 to about 20 hours, and A third embodiment sets forth a process for preparing the ampholytic polymeric microemulsion comprising:
(a) admixing
  (i) an aqueous solution comprising an (alk)acrylamide monomer and about 1 to about 15 mole percent ethylenically unsaturated anionic comonomer, a formaldehyde and a secondary amine or a complex thereof;
  (ii) at least one hydrocarbon liquid; and
  (iii) an effective amount of surfactant or surfactant mixture, so as to form an inverse microemulsion;
(b) subjecting the inverse microemulsion obtained in step (a) to polymerization conditions and simultaneously allowing the formaldehyde and secondary amine to react with the (alk)acrylamide amide groups; and
(c) quaternizing the polymer resulting (d) from step (b); and
(d) heat treating the quaternized polymer resulting from step (d) to provide a polymer with a standard viscosity of at least about 2.1 cps when measured at 0.1 percent concentration in a 1 molar sodium chloride solution, by:
  (i) treating the polymer by adding, in any order, effective amounts of acid, a formaldehyde scavenger compound and water, and
  (ii) heating the treated polymer to a temperature of from about 40 to about 80° C. for about 3 to about 20 hours, and A process for preparing an ampholytic polymer which comprises preparing an ampholytic polymeric microemulsion according to any of the three procedures described above, though preferably the first procedure, and recovering the ampholytic polymer from the ampholytic polymeric microemulsion is also provided by the present invention.

Further in accordance with the present invention are provided methods of flocculating suspended material in aqueous dispersions, particularly aqueous dispersions having a relatively low cationic demand, by treating the dispersion with an effective amount of a dilute aqueous solution comprising the ampholytic polymers of the present invention.

DETAILED DESCRIPTION OF THE INVENTION

The present invention, in a broad sense, is directed to ampholytic polymers comprising repeating units of quaternary dialkylaminomethyl (alk)acrylamide and at least one anionic comonomer such that the ampholytic polymer has a standard viscosity of at least about 2.1 cps when measured at 0.1 percent concentration in a 1 molar sodium chloride solution. More specifically, the present invention provides copolymers of quaternary dialkylaminomethyl (alk)acrylamide and about 1 to about 15 mole percent, based on the moles in the total polymer, of ethylenically unsaturated anionic comonomer. The resulting copolymers have a standard viscosity of at least about 2.1 cps when measured at 0.1 percent concentration in a 1 molar sodium chloride solution. Suitable ethylenically unsaturated anionic comonomers are those that, when incorporated into the ampholytic polymer in amounts ranging from about 1 to about 15 mole percent, based on the moles in the total polymer (total polymer), and heat treated in accordance with the instant invention, provide the ampholytic polymer with a standard viscosity of at least about 2.1 cps when measured at 0.1 percent concentration in a 1 molar sodium chloride solution. The ethylenically unsaturated anionic comonomers may be used to make the ampholytic polymers by converting them into their salt. Preferred anionic comonomers include acrylic acid; 2-acrylamido-2-alkyl sulfonic acid; methacrylic acid, fumaric acid, crotonic acid; maleic acid; styrene sulfonic acid; their salts and mixtures thereof and the like. Acrylic acid and its acrylate salts are most preferred. If desired, more than one type of anionic monomer may be incorporated into the backbone of the ampholytic polymer. The amount of anionic comonomer present in the ampholytic polymer is critical insomuch as it should not range above about 15 mole percent, based on total polymer. Preferably the anionic content may range up to about 12 mole percent, more preferably up to about 10 mole percent. The lower end of the effective amount of anionic comonomer is not critical and, while amounts less than 1 mole percent may be used, generally at least about 1 mole percent, preferably at least about 2 mole percent and more preferably at least about 5 mole percent anionic comonomer, based on total polymer, should be present in the ampholytic polymer. It is optimally preferred to have about 5 to about 12 mole percent anionic comonomer in the ampholytic polymer and more preferably about 5 to about 10 mole percent, most preferably 10 mole percent, anionic comonomer, based on total polymer.

While the ampholytic polymers of the present invention are generally made by copolymerizing, in a microemulsion, (alk)acrylamide with the ethylenically unsaturated anionic comonomer or mixture of comonomers, it is alternatively possible to prepare an ampholytic polymer of the present invention by hydrolyzing an (alk)acrylamide polymer in a microemulsion and then functionalizing by Mannich reaction and quaternization followed by heat treating according to knowledge within the art and through routine experimentation.

The (alk)acrylamide units in the polymers of the present invention may be acrylamide, methacrylamide or ethacrylamide, though acrylamide is preferred.

Optionally, the backbones of the ampholytic polymers may comprise, in addition to (alk)acrylamide and anionic comonomers, cationic or non-ionic, ethylenically unsaturated comonomers. Preferably, such cationic and non-ionic comonomers are water-soluble. Generally, up to about 90 mole percent cationic comonomer may be added or up to about 90 mole percent nonionic comonomer may be added, provided the minimum standard viscosity of 2.1 cps is obtained.

Useful cationic comonomers include diallyl dialkylammonium chlorides, N,N-dialkylaminoalkyl (meth)-acrylates, quaternary N,N-dialkylaminoalkyl(meth)acrylates, N,N-dialkylaminoalkyl (meth)acrylamides, quaternary N,N-dialkylaminoalkyl (meth)acrylamides, their salts and mixtures thereof. Suitable non-ionic comonomers generally comprise N-vinyl pyrrolidone, N,N-dialkyl(alk)acrylamides, hydroxyalkyl(meth)acrylates; formamide, and the like. Small quantities, i.e., up to about 10% by weight of other copolymerizable comonomers, such as methyl acrylate; methyl methacrylate; acrylonitrile, vinyl acetate, styrene, etc. may also be used.

The molecular weight of the polymers of the present invention is not critical and may vary over a wide range from about 2 million to about 75 million. Preferred polymers have a weight average molecular weight in the range of about 10 to 50 million.

The ampholytic polymers of the present invention are generally prepared in a microemulsion by polymerization, Mannich reaction with formaldehyde and a secondary amine, quaternization with an alkylating agent and heat treating. The ampholytic polymers may be recovered from the microemulsion using methods known in the art. The resulting ampholytic polymers may be added to water to form dilute aqueous solutions and used to flocculate suspended solids in various aqueous dispersions. Alteratively, the ampholytic polymers may be employed in their microemulsion form by adding the microemulsion to the medium to be treated or typically by inverting them into water, optionally using a breaker surfactant.

Polymerization in inverse microemulsions is known to those skilled in this art. Conventional microemulsion polymerization techniques as disclosed in, for example, U.S. Pat. Nos. 5,037,881; 5,037,863; 4,521,317; 4,681,912 and GB 2162492A., the disclosures of each of which are incorporated herein by reference, may be employed to prepare the polymers of the present invention.

Generally, microemulsion polymerization is effected by (i) preparing a monomer containing microemulsion by mixing an aqueous solution of monomers with a hydrocarbon liquid containing an appropriate amount of surfactant or surfactant mixture to form an inverse (water-in-oil) microemulsion comprising small droplets dispersed in a continuous oil phase and (ii) subjecting the monomer-containing microemulsion to polymerization conditions. It is not necessary to apply energy, e.g., apply shear, to the emulsion to obtain the small droplets as they form spontaneously, although a microemulsion prepared as disclosed herein, which is also subject to shear is not beyond the scope of this invention.

In the preferred process for preparing the ampholytic polymers of the present invention an aqueous solution of (alk)acrylamide and one or more anionic comonomers is admixed with a liquid hydrocarbon and a suitable surfactant or surfactant mixture. The resulting admixture forms an inverse (water-in-oil) microemulsion which is then subjected to polymerization conditions, reacted with an effective amount of formaldehyde and a secondary amine or a complex thereof to provide an amidoaminoalkyl group which is then quaternized. The quaternized polymer is heat treated to produce a polymer having a standard viscosity of at least 2.1 cps. The polymers may be used directly in microemulsion form or recovered from the microemulsion.

Optionally, additional ethylenically unsaturated cationic or nonionic comonomers as described above are admixed with the above aqueous and hydrocarbon or oil liquids, preferably with the aqueous phase before it is admixed with the oil phase. Chain transfer agents such as ispropanol, may also be added, and are, in fact, preferred. Other conventional additives such as chelating agents to remove polymerization inhibitors, difunctional monomers such as methylene bis(acrylamide), pH adjustors, initiators and the like may also be added, preferably to the aqueous phase.

Because some anionic comonomers used for the present invention are not very water-soluble, the anionic comonomers may be neutralized with base such as sodium hydroxide, ammonium hydroxide, or the like to obtain the more soluble salt. 10 This neutralization is carded out by adjusting the pH of the aqueous phase to about 7, preferably prior to combining the oil and aqueous phases. Neutralization is less preferred than using the less soluble anionic comonomer because neutralization requires the pH of the (alk)acrylamide/anionic salt copolymeric microemulsion to be later readjusted to acid conditions, i.e., a pH in the range of about 2.5 to about 4.5, preferably about a pH of 3.5, prior to running the Mannich reaction. It is therefore preferred that the anionic comonomers be used in their less soluble acid form in preparing the polymers of the present invention. Indeed, it is surprising, given the low water-solubility of the anionic comonomers, that the anionic comonomers may be used to prepare the ampholytic polymers of the present invention without converting them to their more soluble salt form.

A microemulsion, for purposes of this invention, is generally defined as a thermodynamically stable composition comprising two liquids or phases which are insoluble in each other along with a surfactant or surfactant mixture. Polymeric inverse microemulsions which contain a continuous oil phase and a polymer-containing discontinuous phase (aqueous droplets) are prepared from thermodynamically stable monomer microemulsions. Inverse microemulsions have a narrow droplet size distribution and are usually, but not always, optically transparent. The discontinuous polymer-containing phase of microemulsions form droplets or micelles, which are usually aqueous and usually have an average droplet diameter which is less than about 3000 Å, preferably less than about 2000 Å and most preferably less than about 1 000 Å. Some microemulsions may have an average droplet diameter as large as about 3500 Å.

In order to obtain an inverse microemulsion, specific conditions with respect to surfactant hydrophilic-lipophylic balance (HLB), surfactant concentration or surfactant mixture, temperature, nature of the organic phase and composition of the aqueous phase must be used.

The selection of the organic phase has a substantial effect on the minimum surfactant concentration necessary to obtain the inverse microemulsion and may consist of a hydrocarbon or hydrocarbon mixture. Isoparaffinic hydrocarbons or mixtures thereof are the most desirable in order to obtain inexpensive formulations. Typically, the organic phase will comprise mineral oil, toluene, fuel oil, kerosene, vegetale oils, odorless mineral spirits, mixtures of any of the foregoing and the like.

The ratio by weight of the amounts of aqueous phase (water and polymer) and hydrocarbon phase is chosen as high as possible, so as to obtain, after polymerization, a microemulsion of high polymer content. As a practical matter, this ratio may range, for example, from abut 0.5 to about 3:1 respectively, and usually approximates 1:1.

The one or more surfactants are selected in order to obtain an HLB value ranging from about 7 to 13. This HLB range is an important factor in forming the inverse microemulsion. Preferably, the surfactant or surfactant mixture used has an HLB ranging from about 8 to about 10. When using the anionic comonomers in their acid form, the preferred HLB tends to be lower than when the anionic comonomer is used in its salt form. In addition to the appropriate HLB value, the concentration of surfactant should be optimized, i.e., sufficient to form an inverse microemulsion. Too low a concentration of surfactant leads to the formation of inverse macroemulsions which are not thermodynamically stable and too high a concentration results in increased costs and does not impart any significant benefit. Preferably, surfactants are used in amounts ranging from 10% to 20%, based on aqueous phase, although this range may be altered depending on the surfactant and HLB used. Typical surfactants useful in the practice of this invention may be anionic, cationic or nonionic. Preferred surfactants include polyoxyethylenesorbitol hexaoleate, sorbitan sesquidenate, sorbitan monooleate, polyoxyethylene (20) sorbitan monooleate, sodium dioctylsulfosuccinate, oleamidopropyldimethyl amine and sodium isosteary-1-2-lactate. The most preferred surfactants are sorbitan sesquidenate and polyoxyethylene-sorbitol hexaoleate.

Polymerization of the microemulsion may be carried out in any manner known to those skilled in the art. Initiation may be effected with a variety of thermal and redox free radical initiators, including peroxides, e.g. t-butyl peroxide; azo compounds, e.g. azobisisobutyronitdle; inorganic compounds, such as potassium persulfate and redox couples, such as ferrous ammonium sulfate/ammonium persulfate, or sodium bromate/sulfur dioxide. Initiator addition may be effected any time prior to the actual polymerization per se. When conducting polymerization by free radical initiation it is important to remove oxygen by methods known in the art such as sparging with nitrogen. Polymerization may also be effected by photochemical irradiation processes, such as ultraviolet irradiation or by ionizing irradiation from a cobalt 60 source.

The amino methylation or Mannich reaction is preferably performed after inverse microemulsion polymerization by adding formaldehyde and secondary amine to the polymer to form the tertiary aminomethyl substituent on the (alk)acrylamide portion of the polymer backbone. While any amount of tertiary aminomethyl groups may be substituted on the (alk)acrylamide portion of the polymer backbone, preferably, at least about 20 mole percent, more preferably at least 55 mole tertiary aminomethyl groups should be substituted on the polymer backbone. An amount sufficient to retain net positive charge on the polymer is preferably employed.

It is also possible to perform the Mannich reaction at various other stages in relation to inverse microemulsion polymerization. For example, one may react the (alk)acrylamide monomer and anionic comonomer with the formaldehyde and secondary amine prior to the inverse microemulsion formation and before polymerization of the monomers. Also contemplated, is adding the formaldehyde and secondary amine to the aqueous solution prior to polymerizing and then simultaneously polymerizing the (alk)acrylamide monomer and anionic comonomer and carrying out the Mannich reaction. However, these alternative procedures are less preferred because undesirable side reactions may occur.

Aliphatic aldehyes, preferably formaldehydes useful in the practice of this invention are selected from formaldehyde, paraformaldehyde, trioxane or aqueous formalin, and the like.

Useful secondary amines are selected from dimethylamine, methylethylamine, diethylamine, amylmethylamine, dibutylamine, dibenzylamine, pipeddine, morpholine, ethanoimethylamine, diethanolamine, dimethylethondamine or mixtures thereof.

Especially preferred is a process wherein the formaldehyde comprises paraformaldehyde and the secondary amine comprises dimethylamine. It is also preferred to employ a formaldehyde-secondary amine complex such as N,N-dimethylaminomethyl alcohol. The ratio of formaldehyde to amine is not critical and can range from about 10:1 to 1:10, by mole, respectively. It is generally preferred, however, to use a molar ratio as close to 1:1 as practical. A sufficient quantity of the amine and formaldehyde, or complex thereof, is required to amino methylate and impart tertiary aminomethyl groups to the (alk)acrylamide polymer, preferably to impart at least 20 mole percent of tertiary aminoalkyl groups, more preferably at least 55 mole percent of tertiary aminomethyl groups, based on the total polymer.

The ampholytic polymers produced by the procedures of the present invention are quaternized by methods known in the art, such as by reacting the Mannich polymers with such quaternizing agents as methyl chloride, methyl bromide, methyliodide, dimethyl sulfate, benzyl chloride and the like under known conditions.

Assuming the Mannich reaction runs to completion, up to about 98 mole percent, more preferably as much as about 90 mole percent quaternized amino methyl (alk)acrylamide may be present in the ampholytic polymers. It has been observed that the Mannich reaction may not run to completion, oftentimes leaving anywhere from 0 to about 30 mole percent of unreacted (alk)acrylamide, based on total polymer, remaining in the polymer. The Mannich reaction can also intentionally be partially run to any extent, preferably leaving up to as much as 70 mole percent unreacted (alk)acrylamide based on total polymer, more preferably 35 mole percent unreacted (alk)acrylamide in the polymer backbone. Quaternization reactions tend to run to completion resulting in fully quaternizing substantially all tertiary aminomethyl groups on the (alk)acrylamide portion of the polymer backbone. By only partially running the Mannich reaction and then fully quaternizing, the ampholytic polymers of the present invention may be prepared having as low as 20 mole percent, more preferably as low as 55 mole percent quaternized amino methylated (alk)acrylamide, based on total polymer.

After quaternizing the dialkylaminomethyl (alk)acrylamide/anionic copolymers or ampholytic polymers, the ampholytic polymers are then heat treated which raises the polymer standard viscosity to at least about 2.1 cps. and renders the ampholytic polymers stable and effective as flocculants. Heat treatment is accomplished by adding to the untreated ampholytic polymer under agitation an effective amount of acid, aldehyde scavenger compound and water sufficient to provide a polymer with a standard viscosity of at least about 2.1 cps when measured at 0.1 percent concentration in an a 1 molar sodium chloride solution. Acids which may be employed for use herein are generally those acids, preferably organic carboxylic acids, which when used along with aldehyde scavenger to heat treat the ampholytic polymers described herein produce a polymer with a standard viscosity of at least about 2.1 cps when measured at 0.1 percent concentration in an a 1 molar sodium chloride solution. The acids used should be water soluble and inert with respect to the ingredients that are present in the microemulsion system, i.e., emulsifier, polymer oil and other generally added ingredients. The appropriate acid depends on the amount of anionic comonomer incorporated into the ampholytic polymer. For example, for ampholytic polymers containing about 10 mole percent anionic comonomer such as acrylic acid, suitable acids may generally include those acids having a $pK_a$ of from about 4.1 to about 5.2 and preferably from about 4.4 to about 4.9. For these ampholytic polymers comprising 10 mole percent anionic comonomer, acetic acid having a $pK_a$ of about 4.8 is most preferred for heat treating. While citric acid having a $pK_a$ of about 3.1 may not be as suitable for heat treating an ampholytic polymer containing 10 mole percent anionic comonomer, citric acid may be suitable for heat treating an ampholytic polymer containing less than 10 mole percent anionic comonomer. Moreover, while formic acid and lactic acid having pKa's of 3.8 and 3.9 respectively are less preferred for heat treating an ampholytic polymer comprising 10 mole percent anionic comonomer, these acids would be suitable for heat treating ampholytic polymers containing less than 10 mole percent anionic comonomer. Generally however, suitable acids may include those having a $pK_a$ of from about 3 to about 6, preferably from about 4 to about 5 and most preferably those acids having a pKa around about 4.8.

Examples of acids which may be used in the heat treating process described herein include citric, formic, lactic, and citraconic. Acetic acid is preferred. The quantity of acid used also depends on the amount of anionic comonomer present in the ampholytic polymer. The effective amounts of acid are amounts which will produce according to the invention polymers having a standard viscosity of at least 2.1 cps. As a general rule, as the anionic content in the ampholytic polymer increases, increasing amounts of add are needed to provide a standard viscosity of at least about 2.1 cps when measured at 0.1 percent concentration in a 1 molar sodium chloride solution. Generally, amounts ranging from about 15 to about 60 mole percent, based on the total number of moles of polymer present in the microemulsion, preferably about 25 to about 50 mole percent and more preferably about 33 to about 40 mole percent may be used in the heat treating step, though these amounts may vary depending on the anionic content in the ampholytic polymer.

The aldehyde scavengers useful herein are those water-soluble compounds which have the capability to react or complex with aldehyde. The quantity of aldehyde scavenger or effective amount used in the present invention is an amount which will provide, after heat treating, a polymer having a standard viscosity of at least 2.1 cps. This amount preferably ranges from about 0.01 to about 30 mole percent, preferably ranging from about 0.6 to about 15 mole percent, based on the moles of polymer in the microemulsion.

Aldehyde scavengers include those known in the art such as those compounds having the capability of reacting with formaldehyde, urea, substituted ureas such as ethylene urea, guanidine salts, dicyanidiamide, sulfurous acid and any of its alkali metal salts such as sodium bisulfite, sodium metabisulfite and the like, as well as phosphorous acid and mixtures of any of the foregoing.

The effective amount of water preferably used in heat treating the ampholytic polymers is preferably selected such that the polymer content in the aqueous phase of the resulting ampholytic polymeric microemulsion contains from about 10 to about 45 weight percent polymer, based on the weight of the total aqueous phase and preferably from about 15 to 40 weight percent polymer, same basis. Although the acid, formaldehyde scavenger and water may be separately added to the ampholytic polymer in any order, it is preferred to pre-mix the acid, formaldehyde scavenger and water and gradually add the stabilizing pre-mix to the polymer, with stirring, preferably for a period of over 30 minutes, more preferably over 1 hour. The resulting treated polymer, in microemulsion form, is then heated to a temperature preferably from about 40° to about 80° C. for from about 3 to about 20 hours. More preferably, the treated polymer is heated to a temperature of from about 50° to about 70° C. for anywhere from about 5 to about 20 hours. The heating step can be carded out immediately after addition of the acid, scavenger and/or water, though it is also possible to delay the heating up to the desired time of use of the microemulsion or polymer as a flocculant.

After the formaldehyde scavenger, water and the acid, preferably in the form of an aqueous pre-mix as described above, are added to the microemulsion and the polymeric microemulsion is heated the resulting ampholytic polymer has a standard viscosity of at least 2.1 cps, preferably at least 2.7 mPa.s, and more preferably at least 2.9 mPa.s when measured at 0.1 percent concentration in a 1 molar sodium chloride solution.

Heat treating the ampholytic polymer is critical to obtaining the minimum standard viscosity necessary for effective flocculation performance as shown in Table 4 which lists the standard viscosity values of various ampholytic polymers containing 2, 5, 7.5, 10, 15, 20 and 50 mole percent anionic comonomer (acrylic acid), before and after heat treating.

The ampholytic polymers of the instant invention may be recovered from the microemulsion, after heat treating, using methods known in the art such as filtration, stripping or by adding the microemulsion to an appropriate non-solvent such as acetone, precipitating the polymer and filtering the solids.

The ampholytic polymers and polymeric microemulsions can be used for flocculating suspended solids in various aqueous dispersions, i.e. systems comprising solids and other materials suspended in aqueous medium, and are especially effective in sludges, aqueous dispersions which flocculate more effectively with cationic polymeric flocculants having a lower cationic charge. Such aqueous dispersions include but are not limited to many paper deinking process waters and deinking sludge resulting from the processing of recycled paper, many biologically treated suspensions including sewage sludge and other municipal or industrial sludges, and cellulosic dispersions found in paper production, e.g., paper waste. The polymers and polymeric microemulsions described herein are particularly effective in sludges, preferably paper sludges and sewage sludges having total solids level of at least 2% by weight, preferably of at least 4%, by weight, and most preferably at least 5% by weight.

The methods of flocculating suspended material, including suspended solids, in aqueous dispersions are preferably employed in known applications to facilitate the clarification of aqueous dispersions or the dewatering of sludge-containing aqueous dispersions. The ampholytic polymers or microemulsions may be combined with the dispersion to be flocculated by conventional methods of blending, including those applying shear. To clarify deinking process waters, the floc may be allowed to settle and then is separated from the aqueous portion by conventional means, such as using dissolved air flotation clarifiers. Dewatering sludge may be accomplished by seperating the flocculated aqueous medium through centrifugation, use of screw press, belt press, a clarifier, pressure filtration or gravity filtration.

The ampholytic polymers and ampholytic polymeric microemulsions of the present invention are preferably employed as flocculants prepared in the form of dilute aqueous solutions, though they may also be employed as microemulsions. Dilute aqueous solutions can be prepared by inverting the microemulsion into water, optionally in the presence of a breaker surfactant, or by recovering the polymer from the microemulsion, such as by stripping or by adding the microemulsion to a non-solvent which precipitates the polymer, e.g. isopropanol or acetone, filtering off the resultant solids, drying and redispersing the dry polymer in water. When a breaker surfactant is added for inversion, it should be in an amount sufficient to enable the inverted polymer to reach its maximum standard viscosity. The ampholytic polymeric microemulsions of the present invention may also be stripped to increase the percentage of polymer solids.

The effective amount of dilute aqueous solution or microemulsion used for adequate floc stability can be found by routine experimentation for any particular flocculation process, polymer type and aqueous dispersion medium, since the dosage may vary depending on the flocculation process, polymer type, polymer charge and aqueous medium being treated. Generally, though, the effective amount of dilute aqueous solution or microemulsion used for flocculating suspended solids from aqueous dispersions, preferably sludges, includes amounts which deliver from about 0.2 to about 100 pounds polymer, per ton of suspended solids in the aqueous dispersion, preferably about 0.5 to about 10 pounds polymer, per ton of suspended solids in the medium being treated. For flocculating suspended materials in deinking process waters resulting from the processing of recycled paper, generally the effective amount of dilute aqueous solution or microemulsion is an amount which provides anywhere from about 5 to about 1000 ppm, based on the dispersion being treated, preferably about 8 to about 40 ppm polymer, based on the amount of process water being treated.

DESCRIPTION OF THE PREFERRED EMBODIMENTS

The following examples illustrate the present invention. They are not to be construed to limit the claims in any manner whatsoever.

Standard viscosity (SV) is measured by adding 10.8 parts of a 10.87% aqueous solution of sodium chloride to 10.0 parts of a 0.2% aqueous polymer solution adjusted to pH 7. The resultant mixture, which is 0.1% polymer concentration is stirred for five minutes with the viscosity determined at 25 +/−0.1° C. using a Brookfield viscometer Model DV II with UL adapter at 60 rpm.

Percentage Total Suspended Solids Removal (% TSS Removal) is determined as follows: a 10 mL sample of raw process water is filtered through a pre-weighed 0.45 micron glass fiber membrane. The membrane is oven dried overnight, stored in a desiccator until room temperature, and the captured solids are weighed. Total Suspended Solids (TSS) is then determined as:

$$Raw\ water\ TSS\ (ppm) = \{(A-B) \times 1000\}/10\ mL$$

where:
A=weight of filter+sample solids in mg
B=weight of filter in mg
The same procedure is then applied to clarified process water samples. % TSS Removal is then calculated as:

TSS Removal= {(*Raw water TSS−Clarified water TSS*)× 100)}/*Raw water TSS*

Turbidity is measured using a Hach Model 2100P turbidimeter and values are recorded in nephelometric turbidity units (NTU).

EXAMPLE 1

The preparation of a polymeric (sodium acrylate-co-acrylamide) containing 10 mole % sodium acrylate, quaternary mannich microemulsion and testing results demonstrating flocculant performance is described below.

Microemulsion Preparation 117.4 parts of an aqueous solution containing 50.9 parts acrylamide (AMD), 5.7 parts glacial acrylic acid (AA), and 0.11 parts disodium salt of ethylenediaminetetraacetic acid ($Na_2EDTA$) is neutralized with a 50% solution of sodium hydroxide. The aqueous solution is then added to an organic solution containing 102.8 parts of an isoparaffinic solvent (IPS) having a b.p. of 207°–254° C., 17.6 parts of polyoxyethylenesorbitol hexaoleate (PESH), and 5.9 parts of sorbitan sesquioleate (SS). This is subsequently sparged with nitrogen for 30 minutes at a flow rate of 500 ml/min.

The nitrogen sparge is then lowered to 200 ml/min. and 0.23 parts isopropanol (IPA) and an aqueous solution containing 0.0085 parts sodium bromate (NaBrO$_3$)which is presparged are added. Sparging is continued for approximately five minutes when polymerization is initiated by the introduction of 0.1% SO$_2$ in nitrogen at a flow rate of 30–85 ml/min.

The result is a clear and stable (sodium acrylate-co-acrylamide)(SNAMD) polymeric microemulsion (SV=3.7 cps).

DMAM Preparation

N,N-dimethylaminomethanol (DMAM) is prepared by slowly adding 21.2 parts of 92.5% paraformaldehyde to an appropriate flask containing 48.6 parts of a 60% aqueous solution of dimethylamine and 22.1 parts of deionized water, keeping the exotherm below 25° C. Upon dissolution of the paraformaldehyde, 1.51 parts of methanol, 2.75 parts of dicyandiamide, and 3.86 parts of 97.9% sodium metabisulfite is added for stabilization. After stirring for one hour, any insolubles are allowed to settle and the clear solution containing 49 parts of DMAM solids is decanted.

Mannich SA/AMD Polymeric Microemulsion Preparation 100 parts of the above microemulsion are placed in a suitable reactor. 3.24 parts of glacial acetic acid is then added over 6 hours with vigorous stirring. The microemulsion is then diluted to 18.8% solids with the isoparaffinic solvent used above. 43.8 parts of the above DMAM solution is added to the reactor at a rate of 0.53 ml/min with ample stirring. Subsequent to the addition, the reaction is heated to 35° C. and held for 4.5 hours. The Mannich product is stored under refrigeration and has an SV of 1.7 cps.

Quaternary SA/AMD Mannich Polymeric Microemulsion Preparation 3.26 parts of alkylaryl polyethylene glycol ether (AAPEG) is added to 100 parts of the Mannich product at the rate of 0.11 ml/min. This mixture is then transferred to a Parr Sedes 4560 mini-reactor and stirred. The reactor is evacuated to 100 torr and heated to 30° C. 10.56 parts of methyl chloride gas is delivered at 30 psig. Upon completion of the methyl chloride charge, the reactor is heated to 35° C. for 16 hours. The reactor is then slowly evacuated to 100 torr and maintained for 30 minutes to strip excess methyl chloride. The quaternary polyampholytic microemulsion product is clear and stable with an SV of 1.4 cps.

Heat Treatment of Quaternary Mannich Polymeric SA/AMD Microemulsion 25.0 parts of the above polyampholytic microemulsion is charged to an appropriate flask and stirred vigorously. 7.1 parts of an aqueous solution containing 0.87 parts of acetic acid (glacial, aldehyde free) and 0.30 parts of urea is added to the flask at the rate of 0.12 ml/min. The microemulsion is then transferred to an oven pre-heated to 60° C. for 16 hours. The resultant product is a polyampholytic microemulsion with an SV of 2.8 cps.

Performance Testing

Paper Recycling Sludge:

The efficiency of dewatering a paper recycling sludge having sludge solids of 2.2% (by weight) is determined as follows: 200 parts of sludge is weighed into a square beaker. Aqueous solutions of heat treated polyampholytic flocculants are prepared by adding the microemulsion to water so that the polymer concentration is 0.2 weight percent and then adjusting the pH to 7 with sodium hydroxide. Various doses of the polymer solutions are added to the sludge samples with water being added to the polymer solution to yield an equivalent addition with each dose. The mixture is then agitated for 5 seconds and poured through a Buchner funnel containing a filter cloth. The free drainage is determined by measuring the volume of filtrate collected in 10 and 20 seconds. A sample of the filtrate is then collected for filtrate turbidity measurement in nephelometric turbidity units (NTU). The results are set forth in Table 1 below.

TABLE 1

| Polyampholyte of Example # | Dose (ml) | 10 sec Free Drainage (ml) | 20 sec Free Drainage (ml) | Turbidity (NTU) |
|---|---|---|---|---|
| 1 | 1 | 25 | 40 | 836 |
|   | 2 | 130 | 170 | 119 |
|   | 4 | 110 | 150 | 99 |
|   | 6 | 85 | 126 | 160 |

Paper Recycling Process Water:

The efficiency of clarifying process water from deinking recycled paper is determined as follows: 250 ml of process water having a total solids of 0.28% (by weight) is poured into a 500 ml graduated cylinder. Aqueous solutions of heat treated polyampholytic flocculants are prepared by adding the microemulsion to water so that the polymer concentration is 0.2 weight percent. Various doses of the polymer solutions are added to the substrate followed by inversion until optimum flocculation is seen. The floccules are then floated using pressurized water containing dissolved air. The results are set forth in Table 2 below.

TABLE 2

| Polyampholyte of Example # | Dose (ml) | % TSS Removal | Turbidity (NTU) |
|---|---|---|---|
| 1 | 1 | 97.8 | 225 |
|   | 2 | 99.5 | 55 |
|   | 3 | 98.6 | 41 |

EXAMPLES 2–7

In Examples 2–7 polymeric SNAMD microemulsions are prepared using the procedure for example 1. The formulation amounts, in parts, are provided in Table 3.

TABLE 3

| | Example # | | | | | |
|---|---|---|---|---|---|---|
| | 2 | 3 | 4 | 5 | 6 | 7 |
| Organic Solution | | | | | | |
| IPS | 102.8 | 102.8 | 102.8 | 102.8 | 102.8 | 102.8 |
| PESH | 16.6 | 17.0 | 17.3 | 18.2 | 18.8 | 21.0 |
| SS | 6.9 | 6.5 | 6.2 | 5.3 | 4.7 | 2.5 |
| Aqueous Solution | | | | | | |
| AMD | 55.4 | 53.7 | 52.3 | 48.0 | 45.2 | 28.3 |
| AA | 1.1 | 2.8 | 4.2 | 8.5 | 11.3 | 28.3 |
| Deionized Water | 67.0 | 67.0 | 67.0 | 66.9 | 66.9 | 66.8 |
| IPA | 0.11 | 0.11 | 0.11 | 0.23 | 0.23 | 0.34 |
| $Na_2EDTA$ | 0.11 | 0.11 | 0.11 | 0.11 | 0.11 | 0.11 |
| $NaBrO_3$ | 0.0085 | 0.0085 | 0.0085 | 0.0085 | 0.0085 | 0.0085 |
| % Anionic* | 2 | 5 | 7.5 | 15 | 20 | 50 |
| SV(cps) | 3.3 | 3.5 | 3.8 | 4.2 | 4.4 | 4.9 | mole percent, based on the total polymer

EXAMPLES 8–13

Examples 8–13 describe the preparation of various charged polyampholytic microemulsions from the SNAMD polymeric backbone microemulsions described in examples 2–7. Table 4 provides the SV for the polyampholytic microemulsions before and after heat treating.

EXAMPLE 8

100 parts of microemulsion from example 2 is functionalized by Mannich reaction and quaternization and heat treated using the procedure from example 1 with the following exceptions: 1.74 parts acetic acid is added to the backbone microemulsion followed by dilution to 18.8% solids using IPS and addition of 47.8 parts of DMAM solution, as prepared in example 1. This Mannich product has an SV of 3.8 cps. The quaternization is then carried out by first adding 3.28 parts of AAPEG to 100 parts Mannich product then reacting with 11.2 parts methyl chloride (MeCl) gas. This quaternary product has an SV of 2.3 cps. Finally, 25 parts of the polyampholytic microemulsion is heat treated with 7.1 parts of an aqueous solution containing 0.66 parts acetic acid and 0.30 parts urea. The resultant polymer has an SV of 2.9 cps.

Carbon 13 nuclear magnetic reasonance ($^{13}C$ nmr) analysis of the quaternary product found 2 mole % AA and 74 mole % quaternary amine.

EXAMPLE 9

100 parts of microemulsion from example 3 is functionalized by Mannich reaction and quaternization and heat treated using the procedure from example 1 with the following exceptions: 2.30 parts acetic acid is added to the backbone microemulsion followed by dilution to 18.8% solids using IPS and addition of 46.2 parts of DMAM solution. This Mannich product has an SV of 3.0 cps. The quaternization is then carried out by first adding 3.28 pans of AAPEG to 100 pans Mannich product then reacting with 11.0 parts MeCl gas. This quaternary product has an SV of 1.6 cps. Finally, 25 pans of the polyampholytic microemulsion is heat treated with 7.1 pans of an aqueous solution containing 0.66 pans acetic acid and 0.30 parts urea. The resultant polymer has an SV of 2.9 cps.

$^{13}C$ nmr analysis of the quaternary product found 5 mole % AA and 64 mole % quaternary amine.

EXAMPLE 10

100 parts of microemulsion from example 4 is functionalized by Mannich reaction and quaternization and heat treated using the procedure from example 1 with the following exceptions: 2.77 parts acetic acid is added to the backbone microemulsion followed by dilution to 18.8% solids using IPS and addition of 45.0 pans of DMAM solution. This Mannich product has an SV of 2.0 cps. The quaternization is then carried out by first adding 3.27 pans of AAPEG to 100 parts Mannich product then reacting with 10.78 pans MeCl gas. This quaternary product has an SV of 1.4 cps. Finally, 25 pans of the polyampholytic microemulsion is heat treated with 7.1 parts of an aqueous solution containing 0.87 pans acetic acid and 0.30 parts urea. The resultant polymer has an SV of 2.9 cps.

$^{13}C$ nmr analysis of the quaternary product found about 8 mole % AA and 66 mole % quaternary amine.

EXAMPLE 11

100 parts of microemulsion from example 5 is functionalized by Mannich reaction and quaternization and heat treated using the procedure from example 1 with the following exceptions: 4.19 parts acetic acid is added to the backbone microemulsion followed by dilution to 18.8% solids using IPS and addition of 41.4 parts of DMAM solution. This Mannich product has an SV of 1.25 cps. The quaternization is then carried out by first adding 3.25 parts of AAPEG to 100 parts Mannich product then reacting with 10.1 parts MeCl gas. This quaternary product has an SV of 1.26 cps. Finally, 25 parts of the polyampholytic microemulsion is heat treated with 7.1 parts of an aqueous solution containing 1.05 parts acetic acid and 0.30 parts urea. The resultant polymer has an SV of 2.1 cps.

$^{13}C$ nmr analysis of the quaternary product found 14 mole % AA and 56 mole % quaternary amine.

EXAMPLE 12

100 parts of microemulsion from example 6 is functionalized by Mannich reaction and quaternization and heat treated using the procedure from example 1 with the following exceptions: 5.13 parts acetic acid is added to the backbone microemulsion followed by dilution to 18.8% solids using IPS and addition of 38.9 parts of DMAM solution. This Mannich product has an SV of 1.3 cps. The quaternization is then carried out by first adding 3.24 parts of AAPEG to 100 parts Mannich product then reacting with 9.7 parts MeCl gas. This quaternary product has an SV of 1.2 cps. Finally, 25 parts of the polyampholytic microemulsion is heat treated with 7.1 parts of an aqueous solution containing 1.31 parts acetic acid and 0.30 parts urea. The resultant polymer has an SV of 1.7 cps.
$^{13}$C nmr analysis of the quaternary product found 22 mole % AA and 47 mole % quaternary amine.

EXAMPLE 13

100 parts of microemulsion from example 7 is functionalized by Mannich reaction and quaternization and heat treated using the procedure from example 1 with the following exceptions: 10.78 parts acetic acid is added to the backbone microemulsion followed by dilution to 18.8% solids using IPS and addition of 24.3 pans of DMAM solution. This Mannich product has an SV of 1.42 cps. The quaternization is then carried out by first adding 3.17 parts of AAPEG to 100 parts Mannich product then reacting with 6.6 parts MeCl gas. This quaternary product has an SV of 1.3 cps. Finally, 25 parts of the polyampholytic microemulsion is heat treated with 7.1 parts of an aqueous solution containing 1.31 pans acetic acid and 0.30 parts urea. The resultant polymer has an SV of 1.2 cps.
$^{13}$C nmr analysis of the quaternary product found 47 mole % AA and 11 mole % quaternary amine.

TABLE 4

| Example | 8 | 9 | 10 | 1 | 11 | 12 | 13 |
|---|---|---|---|---|---|---|---|
| Approximate Mole Percent Acrylic Acid Monomer | 2 | 5 | 7.5 | 10 | 15 | 20 | 50 |
| S.V. Before heat treating | 2.32 | 1.64 | 1.44 | 1.42 | 1.26 | 1.20 | 1.26 |
| S.V. After heat treating | 2.9 | 2.9 | 2.9 | 2.8 | 2.1 | 1.7 | 1.2 |

EXAMPLE 14

The performance of the polyampholytic microemulsions of Examples 9 and 10 as flocculants for dewatering sludge containing 2.0% (by weight) total solids is tested as described in Example 1. The results are shown in Table 5.

TABLE 5

| Polyampholyte of Example # | Dose (ml) | 10 sec Free Drainage (ml) | 20 sec Free Drainage (ml) | Turbidity (NTU) |
|---|---|---|---|---|
| 9 | 10 | 97 | 124 | 964 |
|  | 12 | 133 | 159 | 486 |
|  | 14 | 142 | 168 | 246 |
|  | 16 | 142 | 166 | 110 |
| 10 | 10 | 102 | 120 | 857 |
|  | 12 | 122 | 150 | 458 |
|  | 14 | 140 | 163 | 255 |
|  | 16 | 152 | 165 | 127 |

EXAMPLES 15–22

Examples 15–22 describe the use of different heat treatment buffers varying in acetic acid content on the polyampholytes from examples 1 and 11, All buffers contain the same amount of urea as in example 1, Table 6 below describes the acid content and corresponding standard viscosity of various ampholytic polymers.

TABLE 6

| Example # | Polyampholyte example # | Weight %* Acetic Acid in Buffer | SV (cps) |
|---|---|---|---|
| 15 | 1 | 9.2 | 2.7 |
| 16 | 1 | 12.1 | 2.8 |
| 17 | 1 | 4.7 | 2.6 |
| 18 | 1 | 18.4 | 2.5 |
| 19 | 11 | 9.2 | 1.7 |
| 20 | 11 | 12.1 | 2.0 |
| 21 | 11 | 14.7 | 2.1 |
| 22 | 11 | 18.4 | 1.9 |

*weight % is based on the toal weight of the buffer containing acids urea and water

EXAMPLE 23

The performance of polyampholytic microemulsions from examples 1, 10, and 11 is determined by sludge dewatering tests as described in example 1. The results are shown in Table 7. Sludge solids are 5.2%.

TABLE 7

| Example # | Dose (ml) | 10 sec Free Drainage (ml) | 20 sec Free Drainage (ml) | Turbidity (NTU) |
|---|---|---|---|---|
| 1 | 8 | 46 | 70 | 579 |
|  | 10 | 70 | 92 | 201 |
|  | 12 | 88 | 114 | 122 |
|  | 14 | 94 | 118 | 79 |
| 10 | 8 | 50 | 69 | 534 |
|  | 10 | 67 | 92 | 209 |
|  | 12 | 86 | 112 | 110 |
|  | 14 | 94 | 122 | 102 |
| 11 | 8 | 33 | 42 | >1000 |
|  | 10 | 50 | 74 | 462 |
|  | 12 | 83 | 107 | 161 |
|  | 14 | 82 | 108 | 214 |

EXAMPLE 24

The performance of polyampholytic microemulsions from examples 1, 9, and 11 is determined by sludge dewatering tests as described in example 1 and are shown in Table 8. Sludge solids are 2.2%.

TABLE 8

| Example # | Dose (ml) | 10 sec Free Drainage (ml) | 20 sec Free Drainage (ml) | Turbidity (NTU) |
|---|---|---|---|---|
| 1 | 1 | 25 | 4 | 836 |
|  | 2 | 130 | 170 | 119 |
|  | 4 | 110 | 150 | 99 |
|  | 6 | 85 | 126 | 160 |
| 9 | 1 | 44 | 65 | 896 |
|  | 2 | 142 | 170 | 114 |
|  | 4 | 112 | 148 | 82 |
|  | 6 | 90 | 128 | 129 |
| 11 | 1 | 24 | 37 | 689 |
|  | 2 | 78 | 118 | 131 |
|  | 4 | 92 | 142 | 98 |
|  | 6 | 100 | 145 | 196 |

EXAMPLE 25

The performance of polyampholytic microemulsions from examples 1, 8, 9, 10, and is determined by sludge dewatering tests as described in example 1 and are shown in Table 9. Sludge solids are 5.3%.

TABLE 9

| Example # | Dose (ml) | 10 sec Free Drainage (ml) | 20 sec Free Drainage (ml) | Turbidity (NTU) |
| --- | --- | --- | --- | --- |
| 1 | 4 | 88 | 115 | 715 |
|   | 6 | 106 | 130 | 438 |
|   | 8 | 97 | 125 | 405 |
| 8 | 4 | 92 | 120 | 585 |
|   | 6 | 105 | 126 | 350 |
|   | 8 | 88 | 117 | 345 |
| 9 | 4 | 85 | 113 | 709 |
|   | 6 | 103 | 126 | 429 |
|   | 8 | 104 | 126 | 389 |
| 10 | 4 | 92 | 118 | 642 |
|   | 6 | 102 | 128 | 413 |
|   | 8 | 95 | 122 | 362 |
| 11 | 4 | 46 | 65 | >1000 |
|   | 6 | 88 | 117 | 702 |
|   | 8 | 100 | 125 | 645 |

EXAMPLE 26

The performance of polyampholytic microemulsions from examples 1, 9, is determined by sludge dewatering tests as described in example 1 and are shown in Table 10. Sludge solids are 3.7%.

TABLE 10

| Example # | Dose (ml) | 10 sec Free Drainage (ml) | 20 sec Free Drainage (ml) | Turbidity (NTU) |
| --- | --- | --- | --- | --- |
| 1 | 18 | 61 | 86 | 917 |
|   | 22 | 84 | 108 | 443 |
|   | 26 | 107 | 132 | 223 |
| 9 | 18 | 56 | 78 | >1000 |
|   | 22 | 74 | 100 | 760 |
|   | 26 | 107 | 130 | 257 |

EXAMPLE 27

The performance of polyampholytes from examples 1, and 8–11 in process water is shown in Table 11 below. Process water solids is 0.55%.

TABLE 11

| Example # | Dose (ml) | % TSS Removal | Turbidity (NTU) |
| --- | --- | --- | --- |
| 1 | 3 | 99.1 | 153 |
|   | 4 | 97.8 | 400 |
|   | 5 | 97.8 | 172 |
|   | 6 | 98.4 | 219 |
| 8 | 3 | 98.9 | 170 |
|   | 4 | 99.2 | 114 |
|   | 5 | 98.5 | 200 |
|   | 6 | 97.0 | 287 |
| 9 | 3 | 99.0 | 159 |
|   | 4 | 98.6 | 123 |
|   | 5 | 99.8 | 203 |
|   | 6 | 97.6 | 298 |
| 10 | 3 | 99.6 | 167 |
|   | 4 | 99.2 | 97 |
|   | 5 | 97.7 | 192 |
|   | 6 | 96.9 | 266 |
| 11 | 3 | 93.0 | 256 |
|   | 4 | 99.1 | 161 |
|   | 5 | 98.3 | 142 |
|   | 6 | 98.4 | 174 |

EXAMPLE 28

The performance of polyampholytes from examples 1, 9, and 11 in process water is shown in Table 12 below. In this example, a low molecular weight cationic coagulant preceded introduction of the polyampholyte. Process water solids is 0.99%.

TABLE 12

| Example # | Dose (ml) | Coagulant Dose (ml) | % TSS Removal | Turbidity (NTU) |
| --- | --- | --- | --- | --- |
| 1 | 2 | 3 | 99.2 | 133 |
|   | 2 | 4 | 99.4 | 195 |
|   | 2 | 5 | 99.0 | 197 |
| 9 | 2 | 3 | 99.6 | 120 |
|   | 2 | 4 | 99.2 | 145 |
| 11 | 2 | 3 | 99.0 | 108 |
|   | 2 | 4 | 99.6 | 132 |

EXAMPLE 29

The performance of polyampholytes from examples 1, 8, 10, and 11 in process water is shown in Table 13 below. Process water solids is 0.48%.

TABLE 13

| Example # | Dose (ml) | % TSS Removal | Turbidity (NTU) |
| --- | --- | --- | --- |
| 1 | 1 | 96.9 | 269 |
|   | 2 | 94.9 | 384 |
| 8 | 1 | 97.1 | 190 |
|   | 2 | 95.9 | 373 |
| 10 | 1 | 96.1 | 311 |
|   | 2 | 96.3 | 152 |
| 11 | 1 | 96.2 | 346 |
|   | 2 | 97.1 | 185 |

EXAMPLE 30

The performance of the polyampholytic microemulsions from example 1 where 1A is not heat treated and 1B is heat treated is determined by sludge dewatering tests as described in example 1 and are shown in Table 14. Sludge solids are 6.9%. The SV of 1A which is not heat treated is 1.4cps and the SV of 1B which is heat treated is 2.8 cps. The improved performance of 1B demonstrates that flocculation performance improves with increasing SV.

TABLE 14

| Example # | Dose (ml) | 10 sec Free Drainage (ml) | 20 sec Free Drainage (ml) | Turbidity (NTU) |
| --- | --- | --- | --- | --- |
| 1A | 1.2 | 10 | 13 | >1000 |
|   | 1.7 | 11 | 12 | >1000 |
|   | 2.3 | 12 | 18 | >1000 |

TABLE 14-continued

| Example # | Dose (ml) | 10 sec Free Drainage (ml) | 20 sec Free Drainage (ml) | Turbidity (NTU) |
| --- | --- | --- | --- | --- |
| | 2.9 | 13 | 20 | >1000 |
| 1B | 1.2 | 26 | 36 | >1000 |
| | 1.7 | 53 | 74 | 398 |
| | 2.3 | 76 | 96 | 130 |
| | 2.9 | 80 | 100 | 93 |

EXAMPLE 31

Example 31 describes the preparation of a polyampholytic microemulsion made without neutralization of the anionic acrylic acid. The resultant polymer is a poly (acrylic acid-co-acrylamide) ANAMD containing 10 mole % acrylic acid, based on the total moles in the polymer. This microemulsion contains lower levels of coagulum formation.

124.7 parts of an aqueous solution containing 50.9 parts AMD, 5.7 parts AA, 1.0 parts acetic acid and 0.11 parts Na$_2$EDTA is mixed. The aqueous solution is added to an organic solution containing 102.8 parts of IPS, 15.6 parts of PESH, and 7.9 parts of SS. This is then sparged with nitrogen and polymerized as in example 1. The result is a clear and stable polyampholytic microemulsion with an SV of 3.8 cps.
100 parts of this backbone is then diluted to 18.8% with IPS. The mannich and quatemization reactions are run the same as in example 1. The quatemization product gave an SV of 1.3 cps. This product was then heat treated as in example 16 to yield a polyampholyte with an SV of 2.6 cps.
$^{13}$C nmr analysis of the quaternary product found 11 mole % AA and 64 mole % quaternary amine.

EXAMPLE 32

An AA/AMD copolymer microemulsion is prepared using 3.5 mole % AA. This microemulsion is prepared using the unneutralized acid as in example 31.
123.7 parts of an aqueous solution containing 54.5 parts AMD, 2.0 parts AA, and 0.11 parts Na$_2$EDTA is mixed. The aqueous solution is added to an organic solution containing 102.8 parts IPS, 15.6 parts PESH, and 7.9 parts SS. This is then sparged with nitrogen and polymerized as in example 1. The clear microemulsion has an SV of 3.3 cps.
100 parts of this microemulsion is then diluted to 18.8% with IPS and 47.0 parts of DMAM solution, as prepared in Example 1, are added. This Mannich product has an SV of 3.7 cps. The quatemization is then completed by adding 3.28 parts AAPEG to 100 parts Mannich product then reacting with 11.1 parts MeCl. The quaternary product has an SV of 1.6 cps. Finally, this product is heat treated as in example 9 to yield a heat treated polyampholyte with SV of 3.0 cps.

EXAMPLE 33

A microemulsion with 2-acrylamido-2-methyl-1-propanesulfonic acid (AMPS) as comonomer with AMD is prepared and subsequently functionalized to the heat treated polyampholyte. This microemulsion contains 10 mole % AMPS. At this level of anionicity, the SV of the quaternary product is significantly higher using the AMPS comonomer. This may allow for the use of the quaternary product directly in some substrates without need of heat treatment.

123.72 parts of an aqueous solution containing 41.6 parts AMD, 14.9 parts AMPS, 1.72 parts acetic acid, and 0.11 parts Na$_2$EDTA is prepared. The aqueous solution is added to an organic solution identical to that in example 31. The clear microemulsion obtained had an SV of 3.1 cps.
100 parts of this microemulsion is then diluted to 18.8% with IPS and 35.9 parts DMAM solution are added. This Mannich has an SV of 2.9 cps. The quatemization is completed by adding 3.23 parts AAPEG to 100 parts Mannich product then reacting with 9.1 parts MeCl yielding a polyampholyte SV of 2.2 cps. Heat treatment as in example 1 yields a SV of 2.6 cps.

EXAMPLE 34

An AA/AMD copolymer microemulsion is prepared using 12.5 mole % AA. This microemulsion is prepared using the unneutralized anionic comonomer as in example 31.
123.7 parts of an aqueous solution containing 49.3 parts AMD, 7.2 parts AA, and 0.11 parts Na$_2$EDTA is mixed. The aqueous solution is added to an organic solution containing 102.8 parts IPS, 15.6 parts PESH, and 7.9 parts SS. This is then sparged with nitrogen and polymerized as in example 1. The clear microemulsion has an SV of 2.8 cps.
100 parts of this microemulsion is then diluted to 18.8% with IPS and 42.6 parts of DMAM solution, as prepared in Example 1, are added. This Mannich polymer has an SV of 1.4 cps. The quatemization is then completed by adding 3.26 parts AAPEG to 100 parts Mannich product then reacting with 10.3 parts MeCl. The quat product has an SV of 1.2 cps. Finally, this product is heat treated as in example 10 to yield a heat treated polyampholyte with SV of 2.3 cps.
Transmission Electron Microscopy (TEM) analysis of the heat treated product yields a mean aqueous droplet diameter of 890 Å.

EXAMPLE 35

A microemulsion with methacrylic acid (MAA) as comonomer with AMD is prepared and subsequently functionalized by Mannich reaction and quaternization and heat treated to produce a MA/AMD polyampholytic microemulsion containing 10 mole % MAA, based on the total moles in the polymer.
123.7 parts of an aqueous solution containing 50.3 parts AMD, 6.8 parts MAA, and 0.11 parts Na$_2$EDTA is prepared. The aqueous solution is added to an organic solution identical to that in example 25. The clear microemulsion obtained had an SV of 3.1 cps.
100 parts of this microemulsion is then diluted to 18.8% with IPS and 42.9 parts DMAM solution as prepared in Example 1 are added. This Mannich product has an SV of 1.7 cps. The quatemization is completed by adding 3.26 parts AAPEG to 100 parts Mannich product then reacting with 10.4 parts MeCl yielding a polyampholyte with an SV of 1.4 cps. Heat treatment as in example 1 yields a SV of 2.1 cps.

EXAMPLE 36

Example 36 describes the preparation of a polyampholyte similar to example 9, but having a lower cationic charge. This polymer contains 5 mole % AA based on the total moles in the polymer and is reacted to only 55% cationic charge. The AA/AMD backbone polymer is prepared according to example 3. The SV of this polymer is 3.4 cps.

100 parts of this microemulsion is then diluted to 18.8% with IPS and 34.1 parts DMAM solution as prepared in example 1 are added. This product has an SV of 2.4 cps. The quatemization is completed by adding 3.19 parts AAPEG to 100 parts Mannich product then reacting with 7.4 parts MeCl. The low charged polyampholyte obtained has an SV of 1.4 cps. Heat treatment as in example 9 yields a product with SV of 2.9 cps.

EXAMPLE 37

Example 37 describes an alterative method for the preparation of poly (acrylic acid-co-acrylamide) microemulsion by hydrolyzing an acrylamide homopolymer. 123.7 parts of an aqueous phase containing 56.5 parts AMD, 0.11 parts $Na_2EDTA$, and 3.4 parts acetic acid was prepared. This solution was mixed with an organic solution containing 102.8 parts IPS, 16.4 parts PESH, and 7.1 parts SS. After sparging with nitrogen for 30 minutes 0.1 parts IPA and an aqueous solution containing 0.0085 parts $NaBrO_3$ was added. Polymerization was then initiated as in example 1. A few minutes after the maximum temperature of the exotherm was reached, a 50% aqueous solution containing 6.4 pads NaOH is delivered to the reaction. This preparation is then stirred overnight. The product SV=3.7 cps. $^{13}C$ nmr analysis indicates the conversion to 9 mole % AA.

A polyampholytic microemulsion may be prepared from the hydrolyzed AA/AMD microemulsion by Mannich reaction, quatemization and heat treating using the procedures described herein or appropriate variations thereof as found by routine experimentation.

EXAMPLES 38–42

Examples 38–42 describe the effect of different acids used in the heat treatment buffer on the SV of an AA/AMD ampholytic polymer containing 10 mole % acrylic acid in microemulsion form.

25 pads of the quaternary product from example 31 is heat treated as in example 1 with 7.1 parts buffer containing 0.30 parts urea and 33 mole % of acid based on polymer. The results are set forth in Table 15. From the data in Table 15 one skilled in the art may select different acids to use for heat treating and preparing an ampholytic polymer.

TABLE 15

| Example | Acid | Acid $pK_a$ | Product SV (cps) |
|---------|---------|------|-----|
| 31 | Citric | 3.1 | 1.4 |
| 32 | Formic | 3.8 | 1.9 |
| 33 | Lactic | 3.9 | 2.1 |
| 34 | Acetic | 4.8 | 2.5 |

TABLE 15-continued

| Example | Acid | Acid $pK_a$ | Product SV (cps) |
|---------|-----------|------|-----|
| 35 | Citraconic | 6.2 | 1.3 |

We claim:

1. A method of flocculating suspended solids in an aqueous dispersion which comprises treating said dispersion with an effective amount of a microemulsion or a dilute aqueous solution, said microemulsion or dilute aqueous solution comprising a copolymer of (alk)acrylamide and at least one ethylenically unsaturated anionic comonomer, wherein said (alk)acrylamide is substituted with quaternary dialkyl aminomethyl groups;

said anionic comonomer is present in an amount ranging from about 1 to 15 mole percent; and said copolymer has a standard viscosity of at least about 2.1 cps when measured at 0.1 percent concentration in a 1 molar sodium chloride solution and said copolymer having been derived from microemulsion polymerization.

2. A method according to claim 1 wherein the effective amount of said microemulsion or dilute aqueous solution is an amount which contains about 0.2 to about 100 pounds copolymer per ton of suspended solids in the aqueous dispersion.

3. A method according to claim 1 wherein said aqueous dispersion is a sludge.

4. A method according to claim 3 wherein said sludge is municipal sludge.

5. A method according to claim 3 wherein said sludge is industrial sludge.

6. A method according to claim 3 wherein said sludge has a total solids level of at least 4 weight percent.

7. A method according to claim 1 wherein said anionic comonomer is acrylic acid or an acrylate salt.

8. A method according to claim 1 wherein a microemulsion is used to flocculate suspended solids in the aqueous dispersion.

9. A method according to claim 1 wherein a dilute aqueous solution is used to flocculate suspended solids in the aqueous dispersion.

10. A method according to claim 9 wherein said dilute aqueous solution is prepared by inverting a microemulsion comprising said copolymer.

11. A method according to claim 9 wherein said dilute aqueous solution is prepared by recovering one or more of said copolymers.

* * * * *